United States Patent
Morini et al.

(10) Patent No.: US 7,943,717 B2
(45) Date of Patent: May 17, 2011

(54) BUTENE-1 COPOLYMERS AND PROCESS FOR THEIR PREPARATION

(75) Inventors: Giampiero Morini, Padua (IT); Fabrizio Piemontesi, Ferrara (IT); Gianni Vitale, Ferrara (IT); Daniele Bigiavi, Bologna (IT); Anteo Pelliconi, Rovigo (IT); Enea Garagnani, Ferrara (IT); Pietro Baita, Rovigo (IT)

(73) Assignee: Basell Poliolefine Italia, S.p.A., Milan (IT)

(*) Notice: Subject to any disclaimer, the term of this patent is extended or adjusted under 35 U.S.C. 154(b) by 1007 days.

(21) Appl. No.: 10/532,686

(22) PCT Filed: Nov. 3, 2003

(86) PCT No.: PCT/EP03/12233
§ 371 (c)(1),
(2), (4) Date: Jan. 20, 2006

(87) PCT Pub. No.: WO2004/048424
PCT Pub. Date: Jun. 10, 2004

(65) Prior Publication Data
US 2006/0155071 A1    Jul. 13, 2006

Related U.S. Application Data

(60) Provisional application No. 60/431,804, filed on Dec. 9, 2002.

(30) Foreign Application Priority Data

Nov. 28, 2002   (EP) .................................. 02080012

(51) Int. Cl.
C08F 10/04 (2006.01)
C08F 10/14 (2006.01)
C08F 110/04 (2006.01)
C08F 110/14 (2006.01)
C08F 4/44 (2006.01)
C08L 23/00 (2006.01)
C08L 23/04 (2006.01)

(52) U.S. Cl. ............... 526/348.6; 526/123.1; 526/124.3; 525/240; 525/191

(58) Field of Classification Search .................. 525/191, 525/240; 526/348.6, 123.1, 124.3
See application file for complete search history.

(56) References Cited

U.S. PATENT DOCUMENTS

| 3,849,520 | A | * | 11/1974 | Bullard et al. ................. 525/240 |
| 4,220,554 | A | | 9/1980 | Scatá et al. ................. 252/429 B |
| 4,298,718 | A | | 11/1981 | Mayr et al. ..................... 526/125 |
| 4,316,970 | A | * | 2/1982 | Hughes ......................... 525/240 |
| 4,398,006 | A | * | 8/1983 | Tsubaki et al. ................. 526/127 |
| 4,399,054 | A | | 8/1983 | Ferraris et al. .............. 252/429 B |
| 4,469,648 | A | | 9/1984 | Ferraris et al. .................... 264/9 |
| 4,495,338 | A | | 1/1985 | Mayr et al. ..................... 526/125 |
| 4,600,762 | A | * | 7/1986 | Fukui et al. ................. 526/348.6 |
| 4,801,672 | A | * | 1/1989 | Kohyama et al. .......... 526/348.2 |
| 4,882,229 | A | * | 11/1989 | Hwo .............................. 428/461 |
| 4,960,820 | A | * | 10/1990 | Hwo .............................. 524/528 |
| 5,221,651 | A | * | 6/1993 | Sacchetti et al. .............. 502/126 |
| 6,180,720 | B1 | * | 1/2001 | Collina et al. ................. 525/191 |
| 6,465,574 | B1 | * | 10/2002 | Mulas et al. .................. 525/191 |
| 2002/0004575 | A1 | * | 1/2002 | Cozewith et al. .............. 526/348 |
| 2004/0254315 | A1 | | 12/2004 | Resconi ........................ 526/127 |

FOREIGN PATENT DOCUMENTS

| EP | 0172961 | | 3/1986 |
| EP | 186287 | * | 7/1986 |
| EP | 172961 | * | 10/1988 |
| EP | 0353318 | | 2/1990 |
| EP | 0353319 | | 2/1990 |
| EP | 0395083 | | 10/1990 |
| EP | 0553805 | | 8/1993 |
| EP | 0553806 | | 8/1993 |
| EP | 0601525 | | 6/1994 |
| EP | 0640624 | | 3/1995 |
| EP | 640624 | * | 3/1995 |
| EP | 0712869 | | 5/1996 |
| EP | 1215239 | * | 6/2002 |
| JP | 6206940 | * | 7/1994 |
| WO | 9945043 | | 9/1990 |
| WO | 9844001 | | 10/1998 |
| WO | 0063261 | | 10/2000 |
| WO | WO 02083754 | * | 10/2002 |
| WO | 03042258 | | 5/2003 |

OTHER PUBLICATIONS

C. J. Carman et al., "Monomer Sequence Distribution in Ethylene-Propylene Rubber Measured by $^{13}C$ NMR. 3. Use of Reaction Probability Model," *Macromolecules*, vol. 10(3), p. 536-544 (1977).
H. N. Cheng, "$^{13}C$ NMR Analysis of Propylene-Butylene Copolymers by a Reaction Probability Model," *Journal of Polymer Science, Polymer Physics Edition*, vol. 21, p. 573-581 (1983).
T. Asakura et al., "Carbon-13 NMR Spectral Assignment of Five Polyolefins Determined from the Chemical Shift Calculation and the Polymerization Mechanism," *Macromolecules*, vol. 24(9), p. 2334-2340 (1991).
R. Chûjô et al., "Two-site model analysis of $^{13}C$ n.m.r. of polypropylene polymerized by Ziegler-Natta catalyst with external alkoxysilane donors," *Polymer*, vol. 35(2), p. 339-342 (1994).
V. Busico et al., "Regiospecificity of 1-butene polymerization catalyzed by $C_2$-symmetric group IV metallocenes," *Macromol. Rapid Commun.*, vol. 16, p. 269-274 (1995).
J. C. Randall, "A Review of High Resolution Liquid $^{13}$Carbon Nuclear Magnetic Resonance Characterizations of Ethylene-Based Polymers," *Macromol. Chem. Phys.*, vol. C29(2&3), p. 201-317 (1989).

* cited by examiner

*Primary Examiner* — Vasu Jagannathan
*Assistant Examiner* — Irina Krylova
(74) *Attorney, Agent, or Firm* — Dilworth IP, LLC; William R. Reid

(57) ABSTRACT

The present invention relates to butene-1 copolymers containing up to 40% by mol of ethylene and/or propylene derived characterized by the following properties: d) Product of the reactivity ratios $r1 \cdot r2 \leq 2$; e) Content of butene-1 units in form of isotactic pentads (mmmm)>98%; and f) absence of 4,1 insertions of butene units.

23 Claims, No Drawings

BUTENE-1 COPOLYMERS AND PROCESS FOR THEIR PREPARATION

This application is the U.S. national phase of International Application PCT/EP2003/012233, filed Nov. 3, 2003, claiming priority to European Patent Application 02080012.4 filed Nov. 28, 2002, and the benefit under 35 U.S.C. 119(e) of U.S. Provisional Application No. 60/431,804, filed Dec. 9, 2002; the disclosures of International Application PCT/EP2003/012233, European Patent Application 02080012.4 and U.S. Provisional Application No. 60/431,804, each as filed, are incorporated herein by reference.

The present invention relates to butene-1 copolymers containing up to 40% by mol of ethylene and/or propylene derived units, and to a process for their preparation.

Butene-1 copolymers are well known in the art and have a wide range of applicability. In particular, butene-1 copolymers with a low content of comonomer (1-3% by mol) are generally characterized by good properties in terms of pressure resistance, creep resistance, impact strength and can be used in the manufacture of pipes for replacing the metal pipes. One of the key aspects for their application in the pipe sector is the excellent balance between flexibility and rigidity that they must have in order to combine easy pipe workability and mechanical resistance. In addition, butene-1 copolymers with a higher content of comonomer can be used for example as components of blends with other polyolefin or polymeric products, in order to modulate particular properties such as sealing strength, flexibility and softness of the plastic materials.

The butene-1 copolymers can be prepared by copolymerizing butene-1 in the presence of $TiCl_3$-based catalyst components together with diethylaluminum chloride (DEAC) as cocatalyst. The copolymers obtained by this process, however, generally do not show satisfactory properties because of the substantially non-random distribution of the comonomer in the polymer chain. Furthermore, in view of the low yields obtainable with the $TiCl_3$ based catalysts, the butene-1 copolymers prepared with these catalysts have a high content of catalyst residues (generally more than 300 ppm of Ti) which lowers the properties of the polymers making it necessary a deashing step.

Butene-1/propylene copolymers and a method for their preparation are described in EP-A-353319. The said copolymers are obtained by polymerizing the monomers in the presence of a stereospecific catalyst comprising a solid component comprising a Ti compound and a phthalate supported on $MgCl_2$; an alkylaluminum compound and a heterocyclic compound, in particular 1,8-cineole, as external electron-donor compound. In EP-A-353318 the same catalyst system was used to prepare butene-1/ethylene copolymers. The descriptions of both patent applications are silent with respect to certain properties of the copolymers such as product of the monomer reactivity ratios and percent of isotactic pentads which have an effect on the flexibility/rigidity balance of the copolymers. The applicant has reproduced the copolymers disclosed in the cited applications and has found that the balance between the distribution of the comonomer in the polymer chain and the isotacticity is not completely satisfactory.

Butene-1/ethylene copolymers have been disclosed also in PCT/EP 02/06574 by using a catalyst based on metallocene compounds. However, in this kind of copolymers there is the presence of regioerrors due to 4,1 insertions of the butene-1 units. This kind of regioerrors in the polymer chain makes more difficult to tune the comonomer content of the copolymer because a 4,1 insertion can be considered equivalent to two consecutive ethylene units in the polymer chain.

Thus, it would be desirable to find new butene-1 copolymers having a complex of properties making them suitable for the various applications. We have found that this need is satisfied by butene-1 copolymers having a particular balance between isotacticity and distribution of the comonomer together with absence of 4,1 insertions of the butene-1 units.

It is therefore an object of the present invention to provide butene-1 copolymers containing up to 40% by mol of ethylene and/or propylene derived units, characterized by the following properties:

a) Product of the comonomer reactivity ratio $r1 \cdot r2 \leq 2$;
b) Content of butene-1 units in the form of isotactic pentads (mmmm)>98%; and
c) absence of 4,1 butene unit insertions.

In particular, the copolymers object of the present invention are endowed with the following features:

a) Product of the comonomer reactivity ratio $r1 \cdot r2 \leq 1.5$ and preferably $r1 \cdot r2 \leq 1$
b) Content of butene-1 units in the form of isotactic pentads (mmmm)$\geq$98.5% and preferably $\geq$99%; and
c) absence of 4,1 insertions.

Preferably, the content of (mmmm) is >99% in correspondence of $r1 \cdot r2 \leq 1$. Further, the copolymers of the present invention preferably have a Polydispersity Index measured according to the method specified below, ranging from 2 to 15; more preferably ranging from 3 to 10 and in particular in the range 4-8.

The content of ethylene or propylene derived units in the copolymers of the present invention preferably ranges from 0.1 to 35% by mol, more preferably from 0.5 to 30% by mol.

The copolymers having a content of ethylene or propylene lower than about 3% by moles and in particular lower than 2.5% can be particularly suitable for use in the pipe sector. In this case, ethylene is a preferred comonomer. Butene-1 copolymers having a comonomer content in the range of 2-15% by moles and preferably 3-12%, can be suitable also for the preparation of polymer compositions for use in low seal initiation temperature or fiber applications.

The applicant also observed that the butene-1 copolymers according to the present invention generally become amorphous when their comonomer content, in particular when the comonomer is ethylene, is about 12% by mol or higher. At these value of comonomer content in fact, a melting point is no longer detectable by carrying out thermal analysis. Moreover, the amount of fractions soluble in xylene at 0° C. becomes greater than 95%. Said specific copolymers also proved to be very soft as shown by a Shore A value of lower than 70 and in certain cases lower than 50. In view of these properties, these copolymers can be used in particular as components of polymeric compositions for use in applications where a certain level of softness is required.

Therefore, it constitutes a further object of the present invention a polymer composition comprising:

(A) from 1 to 99% by weight of the copolymer object of the present invention; and
(B) from 99% to 1% by weight of another polymeric component;

said percentages being based on the sum of (A)+(B).

In particular, (A) can be present in an amount ranging from 10 to 90% and (B) in an amount ranging from 90% to 10%. Preferably the component (B) comprises an olefin (co)polymer. In particular the component (B) can be selected from ethylene containing (co)polymers, propylene containing (co)polymers and from their mixtures.

Particularly interesting are the polymer compositions comprising:
(A) from 5 to 40% wt of the butene-1 copolymers of the present invention having from 1 to 15% by mol of ethylene or propylene; and
(B) from 60 to 95% wt of a propylene copolymer containing from 1 to 30% by mol of ethylene and/or an α-olefin of formula $CH_2=CHR$, where R is a C2-C10 hydrocarbon group; said percentages being based on the sum of (A)+(B).

Preferably, said α-olefin is butene-1. Particularly interesting are the compositions in which (B) is selected from (a) a propylene copolymer containing both ethylene and butene-1 wherein the content of ethylene is from 1 to 10% and the content of butene-1 is from 1 to 10% and (b) a propylene copolymer containing from 2 to 15% by mol of butene-1.

Said compositions, which are particularly useful in applications where a low seal initiation temperature (SIT) is required, show better performances, in terms of SIT and mechanical properties, with respect to the compositions in which butene-1 copolymers of the prior art are used.

Interesting results have also been obtained by using the copolymers of the invention in the preparation of polymer compositions to be used in applications requiring a specific range of peel force between two layers that have been previously sealed (Seal-Peel applications). Generally, these formulations comprise:
(i) from 5 to 25% wt of the butene-1 copolymer of the invention and
(ii) from 75 to 95% wt of an ethylene polymer; said percentages being based on the sum of (i)+(ii).

The ethylene polymer can be an ethylene homopolymer or copolymer. In particular, it can be selected from branched ethylene homo or copolymers obtained through high pressure high temperature radical initiated polymerization (LDPE), linear ethylene homo or copolymers with alpha-olefins having from 4 to 10 carbon atoms (HDPE or LLDPE) obtained through the use of the well known coordination catalysts such as the Ziegler-Natta catalysts or mixtures thereof.

Also in this case the compositions containing the copolymers of the invention have shown better performances, in terms of peel performances, with respect to the compositions in which butene-1 copolymers of the prior art are used.

The butene-1 copolymers of the present invention can be prepared by polymerization of the monomers in the presence of a stereospecific catalyst comprising (A) a solid component comprising a Ti compound and an internal electron-donor compound supported on $MgCl_2$; (B) an alkylaluminum compound and, optionally, (C) an external electron-donor compound. Magnesium dichloride in active form is preferably used as a support. It is widely known from the patent literature that magnesium dichloride in active form is particularly suited as a support for Ziegler-Natta catalysts. In particular, U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium, X is halogen, preferably chlorine, and y is a number between 1 and n, can be used.

The internal electron-donor compound is preferably selected from esters and more preferably from alkyl, cycloalkyl or aryl esters of monocarboxylic acids, for example benzoic acids, or polycarboxylic acids, for example phthalic or succinic acids, the said alkyl, cycloalkyl or aryl groups having from 1 to 18 carbon atoms. Examples of the said electron-donor compounds are diisobutyl phthalate, diethylphthalate and dihexylphthalate. Generally, the internal electron donor compound is used in molar ratio with respect to the $MgCl_2$ of from 0.01 to 1 preferably from 0.05 to 0.5.

The preparation of the solid catalyst component can be carried out according to several methods.

According to one of these methods, the magnesium dichloride in an anhydrous state and the internal electron donor compound are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the internal electron donor compound is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is pre-activated according to well known methods and then treated with an excess of $TiCl_4$ at a temperature of about 80 to 135° C. which contains, in solution, an internal electron donor compound. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ comprising the internal electron donor compound in solution at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours.

The treatment with $TiCl_4$ can be carried out one or more times. The internal electron donor compound can be added during the treatment with $TiCl_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44001.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$, preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

The external donors (C) are preferably selected among silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. A particularly preferred group of silicon compounds is that in which a is 0, c is 3, b is 1 and $R^1$ is a branched alkyl or cycloalkyl group, optionally containing heteroatoms, and $R^7$ is methyl. Examples of such preferred silicon compounds are cyclohexyltrimethoxysilane, t-butyltrimethdxysilane and thexyltrimethoxysilane. The use of thexyltrimethoxysilane is particularly preferred.

The electron donor compound (C) is used in such an amount to give a molar ratio between the organoaluminum compound and said electron donor compound (c) of from 0.1 to 500, preferably from 1 to 300 and more preferably from 3 to 100.

In order to make the catalyst particularly suitable for the polymerization step, it is possible to pre-polymerize said catalyst in a pre-polymerization step. Said prepolymerization can be carried out in liquid, (slurry or solution) or in the gas-phase, at temperatures generally lower than 100° C., preferably between 20 and 70° C. The pre-polymerization step is carried out with small quantities of monomers for the time which is necessary to obtain the polymer in amounts of between 0.5 and 2000 g per g of solid catalyst component, preferably between 5 and 500 and, more preferably, between 10 and 100 g per g of solid catalyst component.

The polymerization process can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

The polymerization is generally carried out at temperature of from 20 to 120° C., preferably of from 40 to 90° C. The polymerization can be carried out in one or more reactors that can work under same or different reaction conditions such as concentration of molecular weight regulator, comonomer concentration, temperature, pressure etc. Working in more than one reactor under different conditions can lead to the preparation of butene-1 copolymers with different average molecular weight in the two reactors and therefore with a broader molecular weight distribution optionally of bimodal type. Moreover, working in more than one reactor under different conditions has the advantage that the various polymerization step can be properly modulated so as to properly tailoring the properties of the final polymer. This technique has proved to be very effective for solving the operative problems involved with the preparation of the copolymers of the invention with a comonomer content of about 10% by moles or higher. These products in fact, can give problems during certain operations such as pelletization. The applicant has surprisingly found that if the butene copolymer having a final comonomer content of about 10% or higher is obtained through a copolymerization carried out in two or more reactors in series operating under conditions such that in at least one of them is produced a copolymer fraction having a detectable melting temperature, the above operative problems are minimized or fully solved.

In addition, the so obtained products show, for a given total content of comonomer, better mechanical properties, in particular higher tensile strength, with respect to the copolymers having the same total comonomer content but obtained through a single set of polymerization conditions. For example, a butene-1/ethylene copolymer having a total content of ethylene units in the range of 10-25% mol can be advantageously prepared by two polymerization steps under different conditions in which in one of the step is prepared a copolymer having from less than 10% of comonomer for example 1 to 9% while in the other step another copolymer is prepared having a comonomer content higher than 10% and for example in the range 15-40% mol. Depending on the desired kind of properties the skilled in the art can easily adjust the mass balance between the various fractions of the blends in order to have a final content of comonomer that meets the target. The so obtained copolymer can have the same uses as the copolymer obtained via a single set of polymerization conditions. Accordingly, they are particularly suitable for the preparation of polymer compositions for use in applications where a certain level of softness is required.

As mentioned above, the copolymers of the invention are suitable for use in many applications. As a customary routine, for each of these applications the relevant experts can add further polymer components, additives (such as stabilizers, antioxidants, anticorrosives, nucleating agents, processing aids, etc.) and both organic and inorganic fillers which can impart specific properties, without departing from the gist of the invention.

The following examples are given in order to better illustrate the invention without limiting it.

Characterization

Comonomer Content $^{13}C$-NMR spectra were performed on a polymer solution (8-12% wt) in dideuterated 1,1,2,2-tetrachloro-ethane at 120° C. The $^{13}C$ NMR spectra were acquired on a Bruker DPX-400 spectrometer operating at 100.61 MHz in the Fourier transform mode at 120° C. using a 90° pulse, 15 seconds of delay between pulses and CPD (WALTZ16) to remove $^1H$-$^{13}C$ coupling. About 1000 transients were stored in 32K data points using a spectral window of 60 ppm (0-60 ppm).

Butene-Ethylene Copolymers

The ethylene content was obtained from the triad distribution ([E]=[EEE]+[EEB]+[BEB]) which is calculated as:

| | | |
|---|---|---|
| BBB = (C − 2I)/Σ | BBE = B/Σ | EBE = L/Σ |
| BEB = I/Σ | BEE = D/Σ | EEE = (0.25F + 0.5G)/Σ | where Σ = (C − 2I) + B + L + I + D + (0.25F + 0.5G).

B, C, D, F, G, I, L are the integrals of the peaks in the $^{13}C$ NMR spectrum (peak of EEE sequence at 29.9 ppm as reference). The assignment of these peaks are made according to J. C. Randall, *Macromol. Chem Phys.*, C29, 201 (1989) and are reported in Table A (nomenclature according to C. J. Carman, R. A. Harrington and C. E. Wilkes, *Macromolecules*, 10, 536 (1977)).

TABLE A

| Area | Chemical Shift | Assignments | Sequence |
|---|---|---|---|
| B | 37.24 | $T\beta\delta$ | BBE |
| C | 35.20-34.88 | $T\beta\beta$ | BBB |
|   | 34.88-34.49 | $S\alpha\gamma$ | BBEB + BEBE |
| D | 34.49-34.00 | $S\alpha\delta$ | EBEE + BBEE |
| F | 30.39 | $S\gamma\delta$ | BEEE |
| G | 29.9 | $S\delta\delta$ | EEE |
| I | 24.54-24.24 | $S\beta\beta$ | BEB |
| L | 11.22 | $T\delta\delta$ | EBE |

Butene/Propylene Copolymers

The propylene content was obtained from the triad distribution ([P]=[PPP]+[PPB]+[BPB]) which is calculated as:

| | | |
|---|---|---|
| BBB = M/$\Sigma$ | BBP = L/$\Sigma$ | PBP = I/$\Sigma$ |
| BPB = 0.5 D/$\Sigma$ | BPP = ⅓ (A + 0.5 (B + E) + 2 A + B + E)/$\Sigma$ | PPP = (C + 0.5B)/$\Sigma$ |

Where $\Sigma$=M+L+I+0.5D+⅓(A+0.5 (B+E)+2A+B+E)+(C+0.5B) and A, B, C, D, E, I, L, M are the integrals of the peaks in the $^{13}$C NMR spectrum (The peak at 27.73 ppm due the $CH_2$ carbon in the branch of an isotactic BBBBB pentad is used as internal reference). The assignment of these peaks are made according to H. N. Cheng, Journal of Polymer Science, Polymer Physics Edition, 21, 573 (1983) and are reported in Table B (nomenclature according to C. J. Carman, R. A. Harrington and C. E. Wilkes, *Macromolecules*, 10, 536 (1977)).

TABLE B

| Area | Chemical Shift | Assignments | Sequence |
|---|---|---|---|
| A | 47.15 | $CH_2$ chain | BPPB |
| B | 46.83 | $CH_2$ chain | PPPB |
| C | 46.52 | $CH_2$ chain | PPPP |
| D | 43.67 | $CH_2$ chain | BPBX |
| E | 43.37 | $CH_2$ chain | PPBX |
| I | 28.13 | $CH_2$ branch | PBP |
| L | 27.93 | $CH_2$ branch | BBP |
| M | 27.73 | $CH_2$ branch | BBB |

Determination of the Product of the Reactivity Ratios r1×r2

The product of reactivity ratios are obtained from $^{13}$C NMR triad distribution according to C. J. Carman, R. A. Harrington and C. E. Wilkes, *Macromolecules*, 10, 536 (1977) using the following expressions.

Butene/Ethylene Copolymers:

$$r_1 r_2 = 1 + \left(\frac{[EEE] + [BEE]}{[BEB]} + 1\right) - \left(\frac{[B]}{[E]} + 1\right)\left(\frac{[EEE] + [BEE]}{[BEB]} + 1\right)^{0.5}$$

Butene/Propylene Copolymers:

$$r_1 r_2 = 1 + \left(\frac{[PPP] + [BPP]}{[BPB]} + 1\right) - \left(\frac{[B]}{[P]} + 1\right)\left(\frac{[PPP] + [BPP]}{[BPB]} + 1\right)^{0.5}$$

Determination of Isotactic Index (mmmm %). by $^{13}$C NMR

The assignment of the pentad signals in the region of branch methylene carbons was made according to *Carbon-13 NMR Spectral Assignment of Five Polyolefins Determined from the Chemical Shift Calculation and the Polymerization Mechanism*, T. Asakura and others, *Macromolecules* 1991, 24 2334-2340.

Due to the superimposition between stereoirregular pentads and peaks from either BBE/EBE or BBP/PBP sequences, the isotacticity of the BBBBB pentad was evaluated from the amount of mrrm pentad (signal at 26.59 ppm) according to the following expression based on the pure "asymmetric bernoullian site" (see *Two-site model analysis of $^{13}$C NMR of polypropylene polymerized by Ziegler-Natta catalyst with external alkoxysilane donors*, R. Chûjô, Y. Kogure, T. Väänänen, *Polymer*, 1994, 35, 339-342):

$$mmmm\% = 100 \cdot I(mmmm)/[I(mmmm) + 5 \cdot I(mrrm)]$$

Where I(mmmm) is the area of the mmmm signal at 27.73 ppm and I(mrrm) is the area of the single unit error pentad mrrm.

Determination of the Percentage of 4,1 Inserted Butene Units

In the case of either butene homopolymers or butene/propylene copolymers the amount of 4,1 inserted butene units is determined via $^{13}$C NMR spectroscopy using the above-mentioned experimental conditions. Assignments of 4,1 inserted units are made according to V. Busico, R. Cipullo, A. Borriello, *Macromol. Rapid. Commun.* 16, 269, (1995).

The content of 4,1 insertions is calculated as:

$$1,4 \text{ units} = 0.5 \times Q \times 100/(Q+B)$$

Q and B are the integrals of the signals reported in Table B (The peak at 27.73 ppm due the $CH_2$ carbon in the branch of an isotactic BBBBB pentad is used as internal reference).

TABLE B

| Integral | Chemical Shift (ppm) | Carbon | Sequence |
|---|---|---|---|
| B | 40.21 | $CH_2$ ($S_{\alpha\alpha}$) | B |
| Q | 37.3 | CH | —CH($CH_2CH_3$)—($CH_2$)$_5$—CH($CH_2CH_3$)— |

The percentage of the 4,1 inserted butene units in the case of butene/ethylene copolymers is assumed to be the same as that obtained for the butene-1 homopolymers prepared under identical polymerization conditions apart from the absence of comonomer.

Determination of Polydispersity Index.

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/second. From the modulus separation value, one can derive the P.I. by way of the equation:

$$P.I. = 54.6 * (\text{modulus separation})^{-1.76}$$

in which the modulus separation is defined as:

modulus separation=frequency at G'=500 Pa/frequency at G''=500 Pa wherein G' is storage modulus and G' is the loss modulus.

Determination of Shore A
Measured According to ASTM D2240
Tensile Properties
Measured according to ASTM-D638 on a 1.9 mm thick plaque obtained by compression molding (at 200° C. with an cooling of 30°/min) of a polymer composition obtained by mixing in a Brabender the relevant copolymer sample with 1% 2,6-di-t-butyl-4-methyl phenol (BHT) at 180° C.

Seal initiation temperature (SIT): determined by preparing 50 μm-thick films by extruding the compositions of the examples at about 200.degree. C. Each film thus obtained is laid over a plaque of polypropylene having a xylene-soluble of 4% by weight, melt flow rate of 2 g/10 min. The overlapped film and plaque are bonded in a plate-press at 200.degree. C. with a load of 9000 kg. The said load is maintained for 5 minutes. The resulting bonded test pieces are then stretched six times their length and width using a TM LONG film stretcher, thus obtaining films of a thickness of about 20.mu.m. 5.times.10 cm specimens are obtained from the said films. The sealing values are obtained by applying a 200 g load to heat-sealed samples. For each measurement two of the above specimens are overlapped with the heat-sealable layers, made up of the compositions of the examples, touching each other. The said overlapped specimens are then sealed along the 5 cm side using a Xentinel combination laboratory sealer model 12-12 AS. The sealing time is 5 seconds, the pressure about 0.12 MPa (1.2 atm) and the width of the seals 2.5 cm. The sealing temperature is increased by 2.degree. C. for each sample to be measured. The sealed samples are then cut to obtain 2.5.times.10 cm strips, whose unsealed ends are attached to a dynamometer, and the minimum seal temperature where the seal does not break when a 200 g load is applied is determined. This temperature represents the seal initiation temperature Determination of Peel Strength
1 Sealing. The film to be tested is cut (MD direction) to samples having a width of 150 mm and a length of 200 mm. Pieces of a 400 μm thick film of the same polymer used for the support layer are cut in the same dimensions, thereby obtaining substrate pieces. Both the samples of films to be tested and the substrate pieces are put between the sealing bars of a KOPP SPGE 20 laboratory sealing machine, with the samples on the top. The upper sealing bar is heated up to the sealing temperature. The sealing bars are closed for 1 second under a pressure of 1.6 bar and seals are produced (100 mm length, 10 mm weld overlap) in the TD direction. The temperatures at which the samples are sealed to the substrate pieces are reported in Table 1.
2. Peel Test After conditioning the sealed samples for 24 hours at 23.degree. C., the peel strength is tested with an Instron machine. The samples and the substrate pieces to which they are sealed are first cut to test samples having a width of 15 mm and are then clamped between grips with a grip distance of 50 mm. The force needed to pull open the seal with a constant speed of 50 mm/min. is recorded. Such force, expressed in N/15 mm, corresponds to the peel strength and is reported, for each sample, in Table 1.

EXAMPLES

Preparation of Solid Catalyst Component

Into a 500 ml four-necked round flask, purged with nitrogen, 225 ml of $TiCl_4$ were introduced at 0° C. While stirring, 6.8 g of microspheroidal $MgCl_2.2.7C_2H_5OH$ (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh $TiCl_4$ were added, the mixture was reacted at 120° C. for one hour then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Examples 1-5

Preparation of Butene-1/ethylene Copolymers

In a 4 liter autoclave, purged with nitrogen flow at 70° C. for one hour. 1350 g of butene-1, an amount of ethylene as indicated in table 1 and hydrogen as indicated in table 1 were added. The temperature was raised to nearly 75° C. and a pre-reacted mixture containing 75 ml of anhydrous hexane containing 1.4 g of $AliBu_3$, and thexyltrimethoxysilane (Al/thexyltrimethoxysilane molar ratio of 40) and an amount, indicated in table 1, of solid catalyst prepared as reported above were introduced in nitrogen flow to start the reaction.

The total internal pressure was measured and maintained constant for the whole copolymerization time by continuously feeding ethylene. The amount of ethylene fed in this period is reported in Table 1.

After 2 hours the reaction is stopped by discharging the liquid phase (all the prepared copolymers were completely soluble in 1-butene at 75° C.) in an excess of water.

The copolymer was collected and dried overnight in an oven to remove all traces of water. The characterization of the copolymers is reported in Table 2. None of the copolymers showed the presence of 4,1-butene units insertion.

Comparative Example 6

Preparation of Butene-1/ethylene Copolymers

The preparation of the butene-1-ethylene copolymer described in example 2 of EP-A-353318 was repeated. The characterization of the copolymers is reported in Table 2. The copolymer did not show the presence of 4,1-butene units insertion.

Examples 7-10

Preparation of Butene-1/propylene Copolymers

The copolymerization was carried out according to the procedure described in Example 1 with the only difference that propylene in the amount reported in table 3 was used instead of ethylene. The details regarding the amount of catalyst, the total pressure and the hydrogen used are also indicated in table 1. The characterization of the copolymers is reported in Table 4. None of the copolymers showed the presence of 4,1-butene units insertion.

Examples 11

Preparation of Butene-1/ethylene Copolymers by Sequential Copolymerization

The sequential polymerization was carried out in two liquid-phase stirred reactors connected in series in which liquid butene-1 constituted the liquid medium. The same catalyst system described in the previous examples was injected into the first reactor working under the following conditions:
Temperature (° C.): 75° C.
Ethylene/Butene feed ratio=abt. 5%
Hydrogen/Butene feed ratio=abt 1200 ppm vol After 2 hours of polymerization the content of the first reactor was transferred into the second reactor where the polymerization continued under the same conditions with the only difference that the ethylene feed was discontinued. The polymerization was stopped after 70 minutes and the final copolymer was characterized. On the basis of the polymerization activity about 70% of the total copolymer was produced in the first polymerization step and showed an ethylene content of 12.2% wt. The remaining 30%, produced in the second reactor, had a calculated ethylene content of 1.6% wt. The ethylene content of the final product is therefore about 9%. The results of the characterization carried out on the final copolymer are reported in Table 5.

Example 12

A five layer film of the type A/B/C/B/A having the following composition was prepared.

(A) Seal/Peel layer (15 μm) comprising 65% low density polyethylene having a Melt Index of 1.5 and a density of 0.919; 25% of a linear low density polyethylene (MIE 1; density 0.919) and 15% of the butene-1 copolymer produced as described in Example 1.
(C) Core layer (40 μm) constituted by a linear low density polyethylene (MIE 1; density 0.936)
(B) Backbone layer (15 μm) constituted by a low density polyethylene (MIE 0.9; density 0.93)

The film was tested for determination of Peel strength according to the method reported above. The results are shown in Table 6.

Example 13

A mechanical blend comprising 10% bw of the butene-1 copolymer of example 1 and 90% of an isotactic terpolymer having a SIT (Seal Initiation Temperature) of 93° C. containing 0.5% wt of ethylene, 18% bw of butene-1 and 81.5% of propylene was prepared. On a film obtained from this composition was carried out the test for the determination of the SIT that resulted to be 76° C.

Comparison Example 14

A composition as described in the Example 13 was prepared with the only difference that the butene-1 copolymer used was that of comparison example 6. The SIT determined on the film obtained from this composition was 84° C.

TABLE 1

| Ex | Catalyst mg | $P_{total}$ Bar-g | Ethylene $G^a$ | Ethylene $g^b$ | Yield $Kg/g_{cat}$ |
|---|---|---|---|---|---|
| 1 | 6.5 | 11.5 | 3.0 | 13.4 | 39.2 |
| 2 | 5.9 | 11.8 | 6.0 | 16.5 | 22.0 |
| 3 | 5.3 | 11.9 | 11.5 | 39.4 | 54.7 |
| 4 | 5.8 | 12.4 | 20.0 | 39.0 | 42.2 |
| 5 | 5.2 | 13.2 | 20 | 53 | 44.2 |

$^a$ Ethylene added before the injection of the catalyst.
$^b$ Ethylene added during the copolymerization in order to keep constant the autoclave pressure.

TABLE 2

| Ex | X.S.[1] % wt | [η][2] dL/g | C2⁻ Mol % | $r_1r_2$ | Tm ° C. | ΔH J/g | Tg ° C. | PI | Mmmm % | Tens. Strength MPa | Tens. Mod. 23° MPa | Shore A |
|---|---|---|---|---|---|---|---|---|---|---|---|---|
| 1 | 25.0 | 1.85 | 2.1 | 0.8 | 91.2 | 19.2 | −34 | 4 | 99.3 | 38.3 | 290 | nm |
| 2 | 96.9 | 1.75 | 12.4 | 0.9 | nd- | — | −40 | 3.9 | 99.2 | 14.6 | 70 | 75 |
| 3 | 95.6 | 2.46 | 19.5 | 1.0 | nd- | — | −42 | 3.8 | 99.1 | 5.8 | 10.1 | 45 |
| 4 | 96.2 | 2.39 | 29.5 | 0.9 | nd- | — | −46 | 3.8 | 99.3 | 2.6 | 3.7 | 29 |
| 5 | 99.2 | 1.92 | 34.2 | 0.94 | nd- | — | — | nm | 99.3 | 3.6 | 7.1 | 34 |
| 6* | 80 | 1.9 | 4.3 | 0.8 | nd- | — | — | nm | 97.1 | 30 | 160 | nm | nd = not detectable
nm = not measured
[1]Xylene Soluble at 0° C.;
[2]Intrinsic viscosity in THN;
*Comparative

TABLE 3

| Ex | Catalyst mg | $P_{total}$ Bar-g | Propylene $G^a$ | Propylene $g^b$ | Yield $Kg/g_{cat}$ |
|---|---|---|---|---|---|
| 7 | 11.5 | 12 | 3.0 | 50 | 38.3 |
| 8 | 6.7 | 12 | 6.0 | 26.4 | 43.3 |
| 9 | 17 | 13.2 | 96.3 | 42.7 | 42.6 |
| 10 | 11 | 13.2 | 96 | 82.0 | 40.2 |

$^a$ Ethylene added before the injection of the catalyst.
$^b$ Ethylene added during the copolymerization in order to keep constant the autoclave pressure.

TABLE 4

| Ex | X.S.[1] % wt | $[\eta]$[2] dL/g | Propylene Mol % | $r_1 r_2$ | Tm °C. | ΔH J/g | Tg °C. | mmmm % | Tens. Mod. (1-3% chord) MPa |
|---|---|---|---|---|---|---|---|---|---|
| 7 | 1.2 | 2.41 | 0.6 | 1.2 | 125 | 19.2 | −34 | 99.1 | 286 |
| 8 | 2 | 1.95 | 3.3 | 1.3 | 124 | — | −40 | 98.6 | |
| 9 | 22 | 2.25 | 9.7 | 1.5 | 120 | — | −42 | 98.9 | |
| 10 | 97.6 | 1.7 | 18.1 | 1.7 | 112 | — | −46 | 99.2 | 200 |

[1]Xylene Soluble at 0° C.;
[2]Intrinsic viscosity in THN

TABLE 5

| Ex | $C_2^-$[3] Mol % | Tm °C. | ΔH J/g | TS At break MPa | TM23° MPa | Shore A |
|---|---|---|---|---|---|---|
| 11 | 16.6 | 90 | 6 | 5.6 | 20 | 72 |

The invention claimed is:

1. Butene-1 copolymers comprising a content from 0.1 to 40% by mole of at least one comonomer, the comonomer being selected from ethylene, propylene, or mixtures thereof, the butene-1 copolymers further comprising:
   a) a product of the reactivity ratios $r_1 \cdot r_2 \leq 1.5$;
   b) a content of butene-1 units in form of isotactic pentads (mmmm)>98.5%; and
   c) an absence of 4,1 insertions of butene units,
the butene-1 copolymers being produced by a process comprising copolymerizing butene-1 and the at least one comonomer in the presence of a stereospecific catalyst comprising: (A) a solid catalyst component comprising a Ti compound of formula $Ti(OR)_{n-y}X_y$, where n=4; X is a halogen; and y is a number from 1 to n, and an electron-donor compound selected from phthalates, supported on $MgCl_2$; (B) an alkylaluminum compound; and (C) a thexyltrimethoxysilane external donor.

2. The butene-1 copolymers according to claim 1, wherein the content of (mmmm) is >99% and the reactivity ratio $r_1 \cdot r_2 \leq 1$.

3. The butene-1 copolymers according to claim 1 further comprising a PI ranging from 3-10.

4. The butene-1 copolymers according to claim 1, wherein the content or the at least one comonomer rang from 0.1 to 35% by mol.

5. The butene-1 copolymers according to claim 1, wherein the content of the at least one comonomer ranges from 0.5 to 30% by mol.

6. The butene-1 copolymers according to claim 1, wherein the at least one comonomer is ethylene.

7. The butene-1 copolymers according to claim 1, wherein the at least one comonomer is propylene.

8. The butene-1 copolymers according to claim 1, wherein the content of the at least one comonomer is lower than about 3% by mol.

9. The butene-1 copolymers according to claim 1, wherein the content of the at least one comonomer ranges from 2-15% by mol.

10. The butene-1 copolymers according to claim 1, wherein the content of the at least one comonomer is at least 12% by mol.

11. The butene-1 copolymers according to claim 1, wherein the comonomer is ethylene.

12. The butene-1 copolymers according to claim 1, wherein the butene-1 copolymers do not show a melting point at the thermal analysis.

13. A polymer composition comprising: A) from 1 to 99 wt % of the butene-1 copolymer of claim 1 and (B) from 1 to 99% wt of another polymeric component; the said percentages being referred to the sum of (A) and (B).

14. The polymer composition according to claim 13, wherein the component (B) comprises an olefin (co)polymer.

15. The polymer composition according to claim 13, wherein the component (B) is an ethylene containing (co) polymer, a propylene containing (co)polymer, or mixtures thereof.

16. A polymer composition comprising:
   from 5 to 40% wt of the butene-1 copolymers of claim 1; and
   (B) from 50 to 95% wt of a propylene copolymer comprising from to 30% by mol of at least one comonomer, the comonomer being selected from ethylene and an α-olefin of formula $CH_2=CHR$, wherein R is a $C_2$-$C_{10}$ hydrocarbon group.

17. The polymer composition according to claim 16, wherein said α-olefin is butene-1.

18. The polymer composition according to claim 16, wherein the component (B) is selected from either (a) a propylene copolymer comprising both ethylene and butene-1, wherein the content of ethylene is from 1 to 10% by mol and the content of butene-1 is from 1 to 10% by mol, or (b) a propylene copolymer containing from 2 to 15% by mol of butene-1.

19. A polymer composition comprising: (i) from 5 to 25 wt % of the butene-1 copolymer of claim 1 and (ii) from 75 to 95% wt of an ethylene polymer; said percentages being based on the sum of (i) and (ii).

20. Manufactured articles obtained from a composition comprising the butene-1 copolymer of claim 1.

21. A process for preparing butene-1 copolymers comprising a content from 0.1 to 40% by mol of at least one comonomer, the comonomer being selected from ethylene, propylene, or mixtures thereof, the butene-1 copolymers further comprising:
   a) a product of the reactivity ratios $r_1 \cdot r_2 \leq 1.5$;
   b) a content of butene-1 units in form of isotactic pentads (mmmm)>98.5%; and
   c) an absence of 4,1 insertions of butene units,
   the process comprising copolymerizing butene-1 and at least one comonomer, the comonomer being selected from ethylene, propylene, and mixtures thereof, in presence of a stereospecific catalyst comprising (A) a solid catalyst component comprising a Ti compound of formula $Ti(OR)_{n-y}X_y$, where n—4; X is a halogen; and y is a number from 1 to n, and an electron-donor compound selected from phthalates, supported on $MgCl_2$; (B) an alkylaluminum compound; and (C) a thexyltrimethoxysilane external donor.

22. The process according to claim 21, wherein the process is carried out in liquid butene-1.

23. The process according to claim 22, wherein the process is carried out in at least two reactors working under different reaction conditions.

* * * * *